United States Patent
Myung et al.

(10) Patent No.: US 11,190,322 B2
(45) Date of Patent: Nov. 30, 2021

(54) METHOD FOR ALLOCATING RESOURCES FOR BASE STATION TERMINAL IN WIRELESS COMMUNICATION SYSTEM, AND COMMUNICATION APPARATUS UTILIZING SAID METHOD

(71) Applicant: LG Electronics Inc., Seoul (KR)

(72) Inventors: Sechang Myung, Seoul (KR); Seonwook Kim, Seoul (KR); Changhwan Park, Seoul (KR); Joonkui Ahn, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 93 days.

(21) Appl. No.: 16/610,441

(22) PCT Filed: Apr. 27, 2018

(86) PCT No.: PCT/KR2018/004951
§ 371 (c)(1),
(2) Date: Nov. 1, 2019

(87) PCT Pub. No.: WO2018/203626
PCT Pub. Date: Nov. 8, 2018

(65) Prior Publication Data
US 2021/0160030 A1    May 27, 2021

Related U.S. Application Data

(60) Provisional application No. 62/501,081, filed on May 3, 2017.

(51) Int. Cl.
*H04W 72/04* (2009.01)
*H04L 5/00* (2006.01)
*H04W 74/08* (2009.01)

(52) U.S. Cl.
CPC ......... *H04L 5/0053* (2013.01); *H04W 72/042* (2013.01); *H04W 72/0446* (2013.01); *H04W 74/08* (2013.01)

(58) Field of Classification Search
CPC .. H04L 5/0053; H04L 5/0078; H04W 72/042; H04W 74/08
See application file for complete search history.

(56) References Cited

U.S. PATENT DOCUMENTS

2009/0125793 A1* 5/2009 Kishigami ........ H04L 25/03318
714/794
2011/0085508 A1    4/2011 Wengerter et al.
(Continued)

FOREIGN PATENT DOCUMENTS

WO    WO2017064101    4/2017

OTHER PUBLICATIONS

Vivo, "Discussion on NR resource allocation," R1-1704501, 3GPP TSG RAN WG1 Meeting #88bis, Spokane, USA, Apr. 3-7, 2017, 5 pages.
(Continued)

*Primary Examiner* — Diane L Lo
*Assistant Examiner* — Abusayeed M Haque
(74) *Attorney, Agent, or Firm* — Fish & Richardson P.C.

(57) ABSTRACT

Disclosed are a method for allocating resources for a base station terminal in a wireless communication system, and a communication apparatus utilizing the method. The method determines a specific number of symbols and the allocable maximum bandwidth for the terminal, selects the maximum transmission block size the terminal can transmit or receive on the basis of the determination, and allocates resources on the basis of the selection.

13 Claims, 13 Drawing Sheets

(56) References Cited

U.S. PATENT DOCUMENTS

| | | | |
|---|---|---|---|
| 2011/0211488 A1 | 9/2011 | Kwon et al. | |
| 2014/0105121 A1* | 4/2014 | Jose | H04L 5/0073 |
| | | | 370/329 |
| 2016/0360462 A1* | 12/2016 | Chockalingam | H04W 36/0058 |
| 2018/0375614 A1* | 12/2018 | Shimezawa | H04L 1/0063 |
| 2019/0037554 A1* | 1/2019 | Gao | H04L 5/0055 |
| 2019/0068318 A1* | 2/2019 | Marinier | H04L 1/0065 |
| 2019/0090126 A1* | 3/2019 | Hayashi | H04W 72/0446 |
| 2019/0140876 A1* | 5/2019 | Yoshimura | H04B 1/00 |
| 2020/0187228 A1* | 6/2020 | Cheng | H04W 72/1289 |

OTHER PUBLICATIONS

Huawei, HiSilicon, "Symbol number of PUCCH in long duration," R1-1705088, 3GPP TSG RAN WG1 Meeting #88bis, Spokane, USA, Apr. 3-7, 2017, 5 pages.

\* cited by examiner

FIG. 11
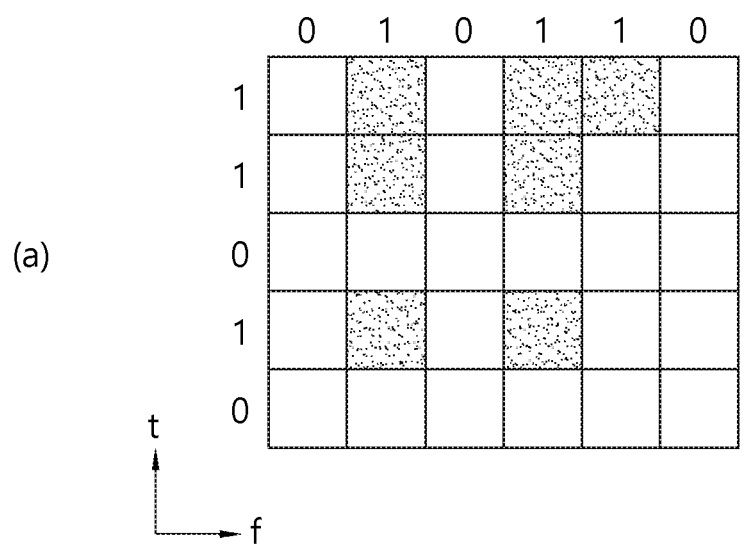
(a)
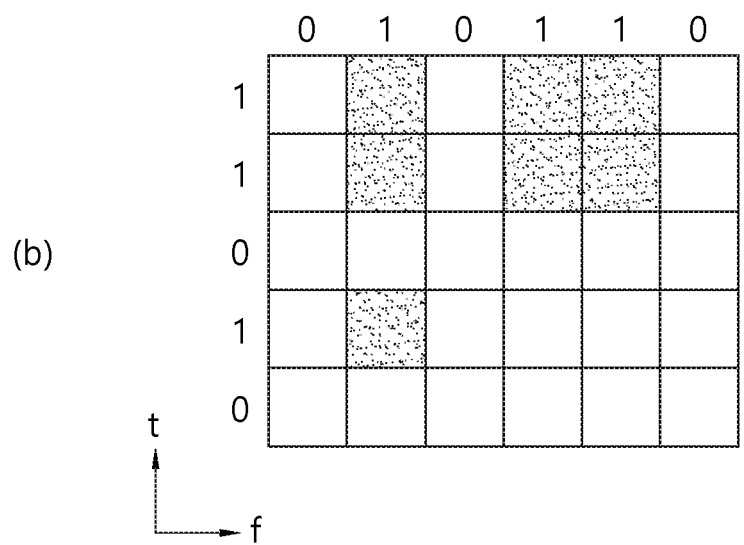
(b)

METHOD FOR ALLOCATING RESOURCES FOR BASE STATION TERMINAL IN WIRELESS COMMUNICATION SYSTEM, AND COMMUNICATION APPARATUS UTILIZING SAID METHOD

CROSS-REFERENCE TO RELATED APPLICATIONS

This application is a National Stage application under 35 U.S.C. § 371 of International Application No. PCT/KR2018/004951, filed on Apr. 27, 2018, which claims the benefit of U.S. Provisional Application No. 62/501,081 filed on May 3, 2017. The disclosures of the prior applications are incorporated by reference in their entirety.

BACKGROUND ART

Field of the Description

The disclosure relates to wireless communication and, more particularly, to a method for a base station to allocate a resource for a UE in a wireless communication system and a communication device using the same.

Related Art

Recently, the 3GPP has conducted the standardization of a wireless communication system using NR as a 5G wireless communication system. The NR system is intended to support a plurality of logical networks in a single physical system and is thus designed to support services having various requirements (e.g., eMBB, mMTC, and URLLC services). For example, a PDSCH and a PUSCH as physical channels for DL/UL data transmission may also be defined in NR. For a PDSCH or PUSCH in NR, a relatively large number of OFDM symbols are configured to transmit a great amount of data, or a relatively small number of OFDM symbols are configured to support low-latency transmission. In this manner, various numbers of symbols may be allocated for data transmission. The duration of data transmission may be semi-statically configured and/or dynamically indicated by a base station, and a transmission start symbol and a transmission termination symbol are also variable. As a method for allocating a resource in the frequency domain, all of RA Type 0, 1, and 2 are taken into consideration on the basis of an LTE resource allocation method.

Also, in NR, since transmission bandwidth is up to 400 MHz and UEs having various supportable bandwidths can coexist, there are a carrier bandwidth, a UE-supported bandwidth, and a bandwidth part for actual resource allocation. DL/UL data scheduling may be performed within the entire carrier bandwidth, or may be performed via two stages in the frequency domain by indicating a bandwidth part within a UE-supported bandwidth in the entire carrier bandwidth and allocating RBs for data transmission within the bandwidth part.

Conventionally, the number of symbols included in one slot is fixed, and the number of data symbols of a PDSCH or a PUSCH scheduled in one slot is fixed. In NR, however, the number of symbols included in one slot may vary by slot, and the number of data symbols scheduled in one slot may also vary by slot. Further, in NR, a transmission bandwidth of up to 400 MHz may be supported, and a low-cost UE may have a limited transmission bandwidth. Accordingly, the maximum bandwidth allocable to a UE may vary by UE. Therefore, a resource allocation method capable of transmitting or receiving a transmission block having the maximum size in view of a variable number of symbols may be needed.

SUMMARY

An aspect of the disclosure is to provide a method for a base station to allocate a resource for a UE in a wireless communication system and a communication device using the same.

In one aspect, a method for allocating a resource for a user equipment (UE) in a wireless communication system is provided. The method performed by a base station is comprising determining a specified number of symbols and a maximum bandwidth allocable for the UE, selecting a maximum transmission block size for transmission or reception of the UE based on the determination, and performing resource allocation for the UE based on the selection.

The specified number of symbols may be less than a number of symbols comprised in one slot.

A number of data symbols allocated to the UE may be greater than the specified number of symbols.

When the resource allocation is performed, the resource allocation may be performed based on UE capability information received from the UE.

The UE capability information may inform a capability of the UE with respect to at least one of the specified number of symbols, the maximum bandwidth, and the maximum transmission block size.

The base station may receive the UE capability information in an initial access process or an RRC connection process.

When a greater number of symbols than the specified number of symbols are allocated, a position of a bandwidth to be allocated to the UE within the maximum bandwidth may be pre-determined.

When the resource allocation is performed, a number of data symbols to be allocated to the UE may be pre-determined.

The number of data symbols may be pre-determined based on a number of resource blocks allocated to the UE.

The resource allocation may be performed based on a two-dimensional bitmap in a time-frequency domain.

Downlink control information (DCI) may be transmitted to the UE, and the DCI may inform a number of resources used for actual data transmission.

In the resource allocation, data transmission duration and a frequency-domain resource may be determined in view of only the maximum bandwidth.

The maximum transmission block size may be determined based on a number of subcarrier groups that are sets of a plurality of subcarriers.

The maximum transmission block size may be determined based on a transmission block size table, and the transmission block size table is defined by a combination of a modulation and coding scheme (MCS) and the number of subcarrier groups.

In another aspect, provided is a communication device comprising a transceiver configured to transmit and receive a radio signal, and a processor configured to be connected with the transceiver and to operate, wherein the processor is configured to determine a specified number of symbols and a maximum bandwidth allocable for the UE, select a maximum transmission block size for transmission or reception of the UE based on the determination, and perform resource allocation for the UE based on the selection.

According to the disclosure, when a base station schedules uplink and downlink data transmissions for a UE, the base station allocates resources in view of the number of symbols, thereby enabling resource-efficient resource allocation.

BRIEF DESCRIPTION OF THE DRAWINGS

FIG. 11 illustrates another example of a method of allocating a resource in a two-dimension time-frequency domain according to an embodiment of the disclosure.

DESCRIPTION OF EXEMPLARY EMBODIMENTS

Figure 1:
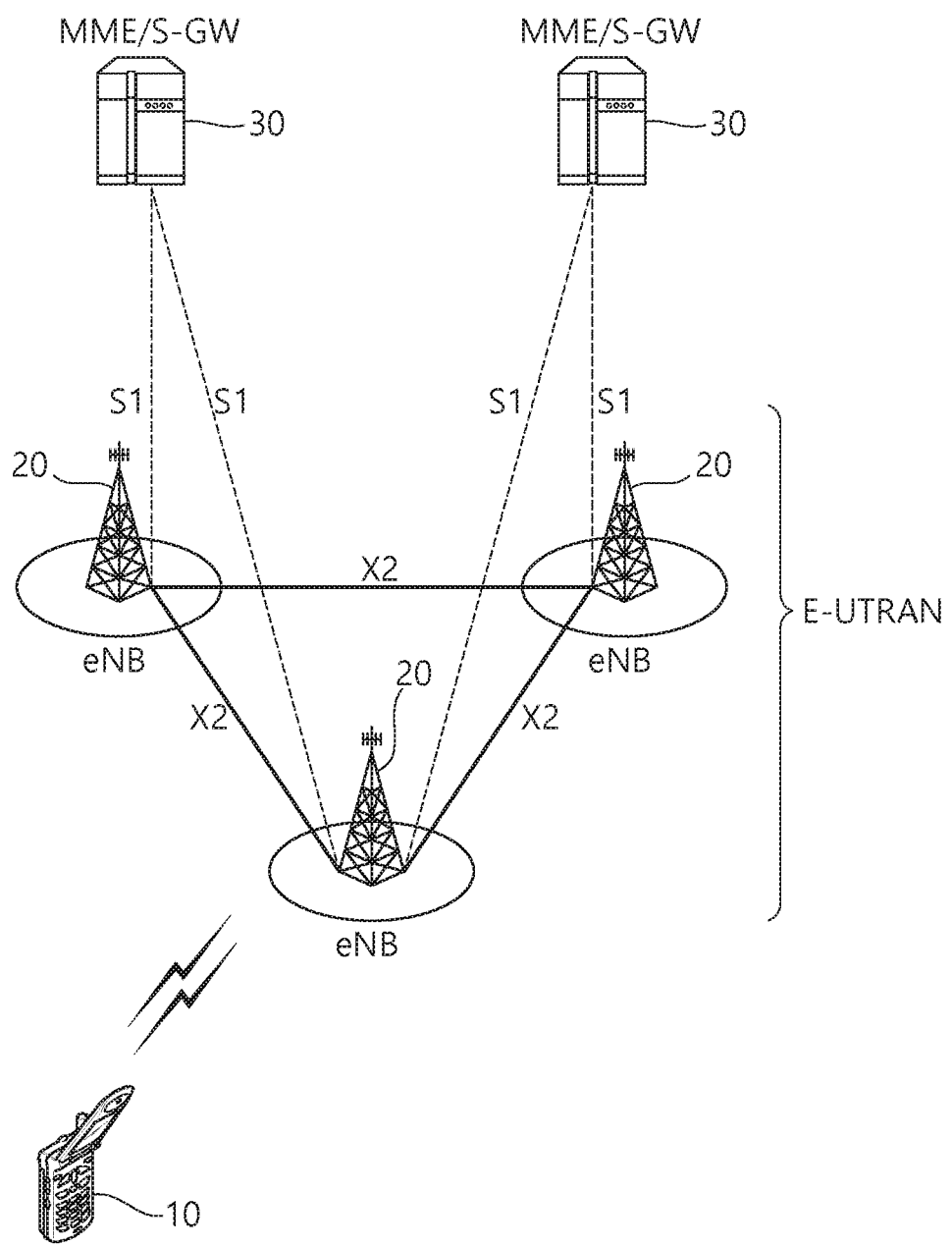
FIG. 1 shows a wireless communication system to which the present description can be applied.

FIG. 1 shows a wireless communication system to which the present description can be applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
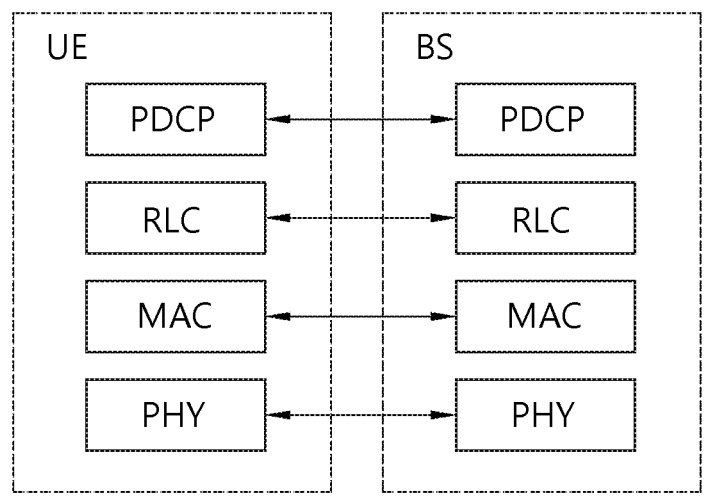
FIG. 2 is a diagram showing a wireless protocol architecture for a user plane.
Figure 3:
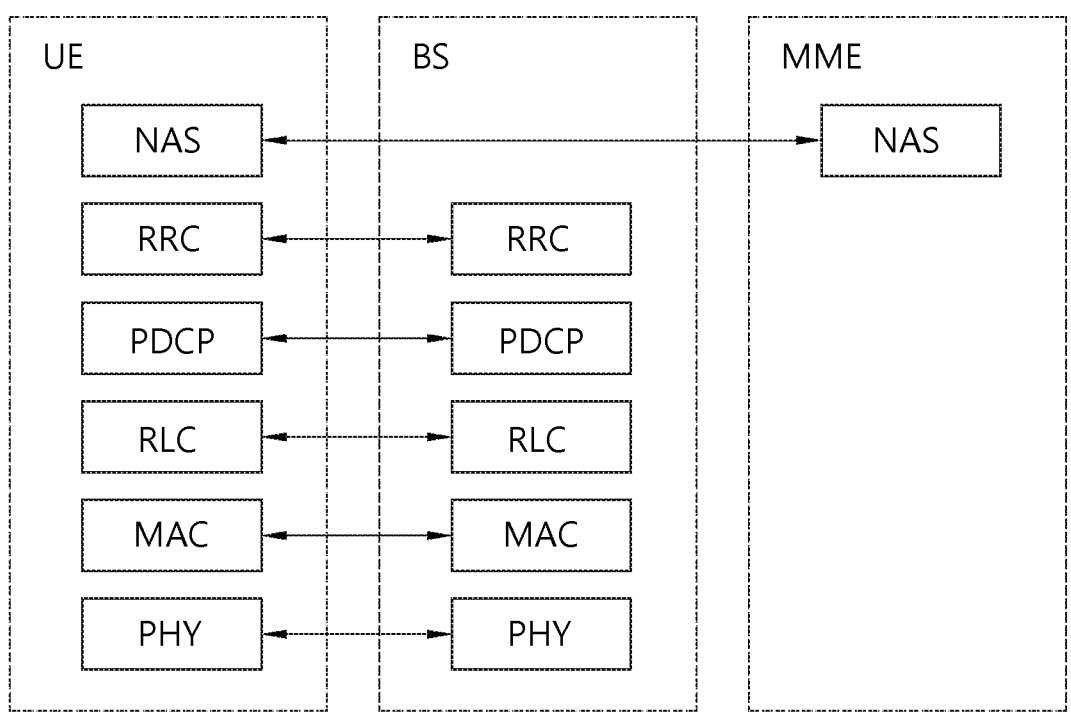
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

Hereinafter, radio resource management (RRM) measurement in an LTE system will be described.

An LTE system supports an RRM operation including power control, scheduling, cell search, cell reselection, handover, radio link or connection monitoring, and connection establishment/re-establishment. Here, a serving cell can request RRM measurement information, which is a measurement for performing an RRM operation, from a UE. Generally, in the LTE system, the UE may measure and report cell search information, reference signal received power (RSRP), and reference signal received quality (RSRQ) about each cell. Specifically, in the LTE system, the UE receives 'measConfig' via a higher-layer signal for RRM measurement from the serving cell. The UE measures RSRP or RSRQ according to information of 'measConfig'. Here, reference signal received power (RSRP), reference signal received quality (RSRQ), and a received signal strength indicator (RSI) defined in the LTE system may be defined as follows.

[RSRP]

Reference signal received power (RSRP), is defined as the linear average over the power contributions (in [W]) of the resource elements that carry cell-specific reference signals within the considered measurement frequency bandwidth. For RSRP determination the cell-specific reference signals R0 according TS 36.211 shall be used. If the UE can reliably detect that R1 is available it may use R1 in addition to R0 to determine RSRP.

The reference point for the RSRP shall be the antenna connector of the UE.

If receiver diversity is in use by the UE, the reported value shall not be lower than the corresponding RSRP of any of the individual diversity branches.

[RSRQ]

Reference Signal Received Quality (RSRQ) is defined as the ratio NxRSRP/(E-UTRA carrier RSSI), where N is the number of RB's of the E-UTRA carrier RSSI measurement bandwidth. The measurements in the numerator and denominator shall be made over the same set of resource blocks.

E-UTRA Carrier Received Signal Strength Indicator (RSSI), comprises the linear average of the total received power (in [W]) observed only in OFDM symbols containing reference symbols for antenna port 0, in the measurement bandwidth, over N number of resource blocks by the UE from all sources, including co-channel serving and non-serving cells, adjacent channel interference, thermal noise etc. If higher-layer signalling indicates certain subframes for performing RSRQ measurements, then RSSI is measured over all OFDM symbols in the indicated subframes.

The reference point for the RSRQ shall be the antenna connector of the UE.

If receiver diversity is in use by the UE, the reported value shall not be lower than the corresponding RSRQ of any of the individual diversity branches.

[RSSI]

The received wide band power, including thermal noise and noise generated in the receiver, within the bandwidth defined by the receiver pulse shaping filter. The reference point for the measurement shall be the antenna connector of the UE. If receiver diversity is in use by the UE, the reported value shall not be lower than the corresponding UTRA carrier RSSI of any of the individual receive antenna branches.

According to the foregoing definitions, the UE operating in the LTE system may be allowed to measure RSRP in a bandwidth corresponding to one of 6, 15, 25, 50, 75, and 100 resource blocks (RBs) through an information element (IE) about an allowed measurement bandwidth transmitted via system information block type 3 (SIB3) in intra-frequency measurement or through an IE about an allowed measurement bandwidth transmitted via SIBS in inter-frequency measurement, or may measure RSRP by default in the entire DL system frequency bandwidth in the absence of the IE. Here, when the UE receives an allowed measurement bandwidth, the UE may regard the relevant value as the maximum measurement bandwidth and may arbitrarily measure an RSRP value within the value. However, when the serving cell transmits an IE defined by WB-RSRQ and sets an allowed measurement bandwidth to 50 RBs or greater, the UE needs to calculate an RSRP value in the entire allowed measurement bandwidth. The UE measures RSSI in the frequency bandwidth of a receiver of the UE according to the definition of an RSSI bandwidth.

Hereinafter, a new radio access technology (new RAT) will be described.

As a growing number of communication devices require higher communication capacity, there is a need for advanced mobile broadband communication as compared to existing radio access technology. Massive machine-type communication (MTC), which provides a variety of services anytime and anywhere by connecting a plurality of devices and a plurality of objects, is also one major issue to be considered in next-generation communication. In addition, designs for communication systems considering services/UEs sensitive to reliability and latency are under discussion. Accordingly, a discussion is in progress on the introduction of next-generation radio access technology considering enhanced mobile broadband communication (eMBB), massive MTC (mMTC), and ultra-reliable and low-latency communication (URLLC). For convenience, this technology is referred to as new RAT or NR in the present description.

Figure 4:
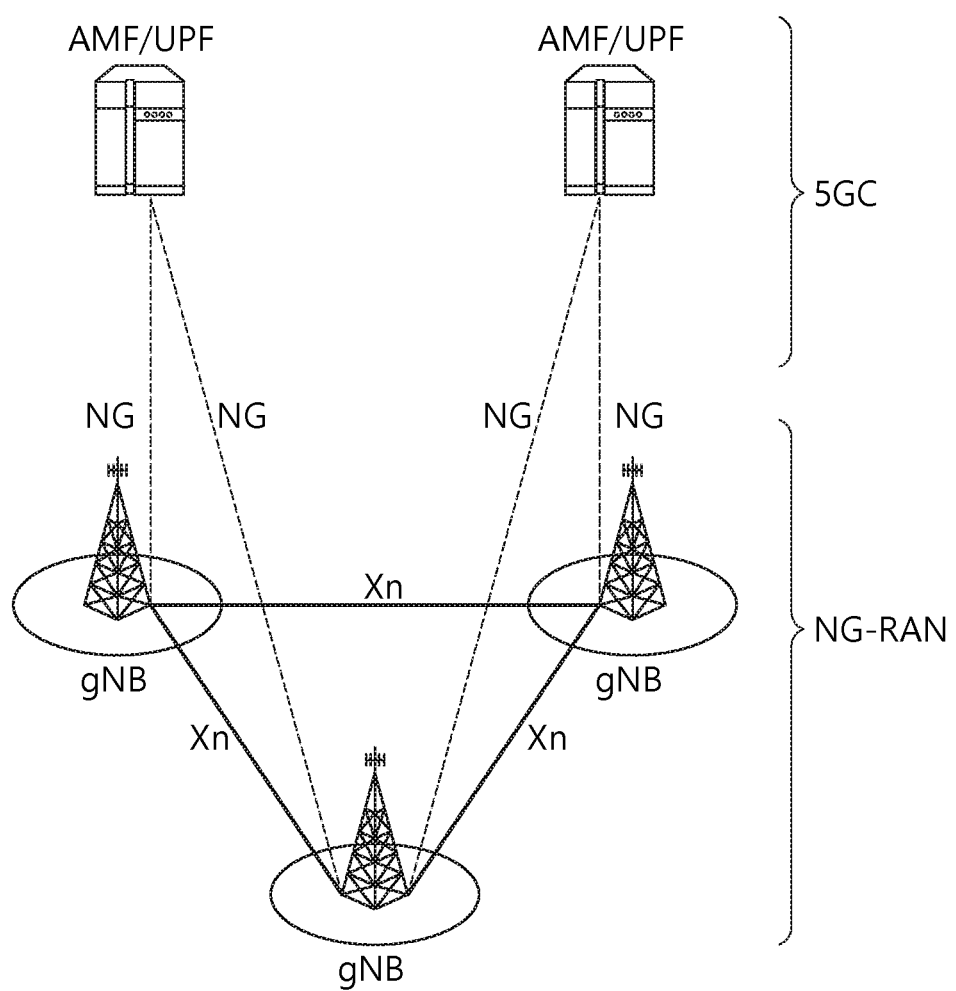
FIG. 4 illustrates system architecture of a next-generation radio access network (NG-RAN) to which NR is applied.

FIG. 4 illustrates system architecture of a next-generation radio access network (NG-RAN) to which NR is applied.

Referring to FIG. 4, the NG-RAN may include a gNB and/or an eNB which provides a UE with user plane and control plane protocol termination. FIG. 4 illustrates a case where only eNB is included. The gNBs and the eNBs are interconnected through an Xn interface. The gNB and the eNB are connected to a 5G core network (5GC) through NG interfaces. More specifically, the gNB and the eNB are connected to an access and mobility management function (AMF) through an NG-C interface and connected to a user plane function (UPF) through an NG-U interface.

Figure 5:
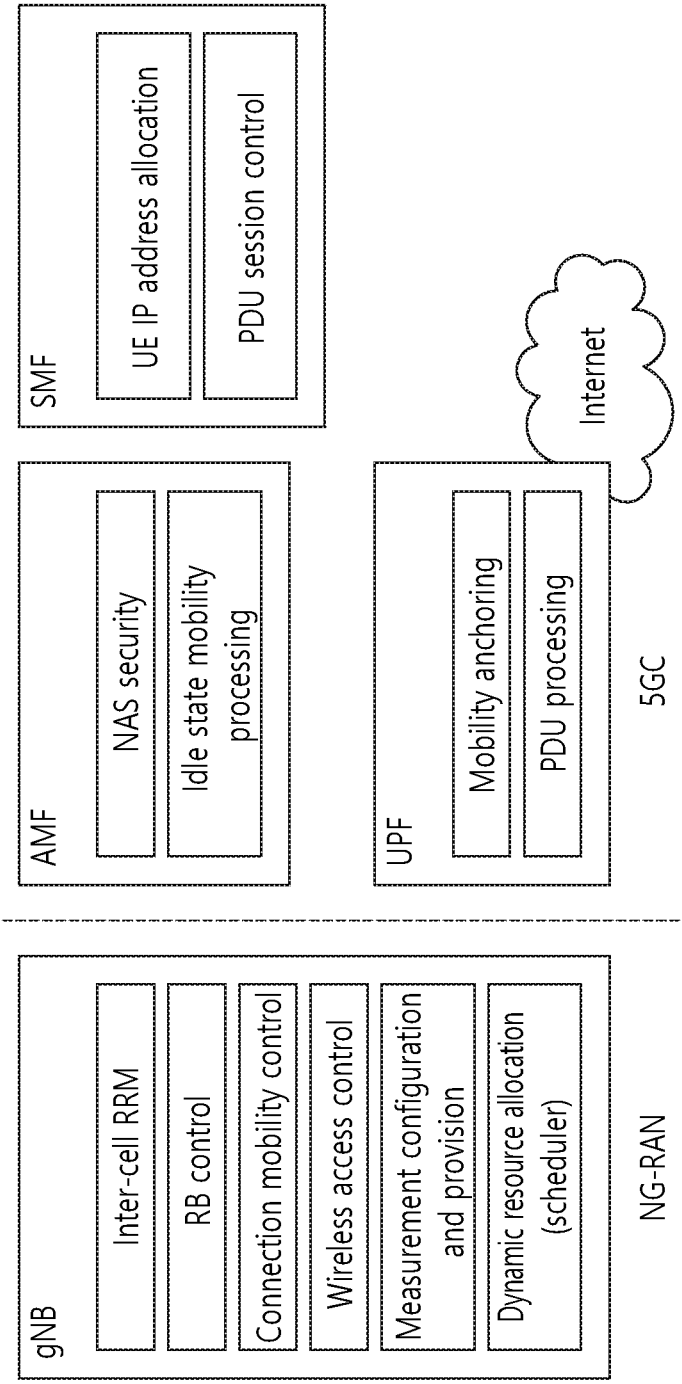
FIG. 5 illustrates function division between the NG-RAN and the 5GC.

FIG. 5 illustrates function division between the NG-RAN and the 5GC.

Referring to FIG. 5, a gNB may provide functions of inter-cell radio resource management (inter cell RRM), RB control, connection mobility control, radio admission control, measurement configuration & provision, dynamic resource allocation, and the like. The AMF may provide functions of NAS security, idle state mobility processing, and the like. The UPF may provide functions of mobility anchoring, PDU processing, and the like. A session management function (SMF) may provide functions of UE IP address allocation, PDU session control, and the like.

In the NR, the following techniques/features may be applied.

<Self-Contained Subframe Structure>

Figure 6:
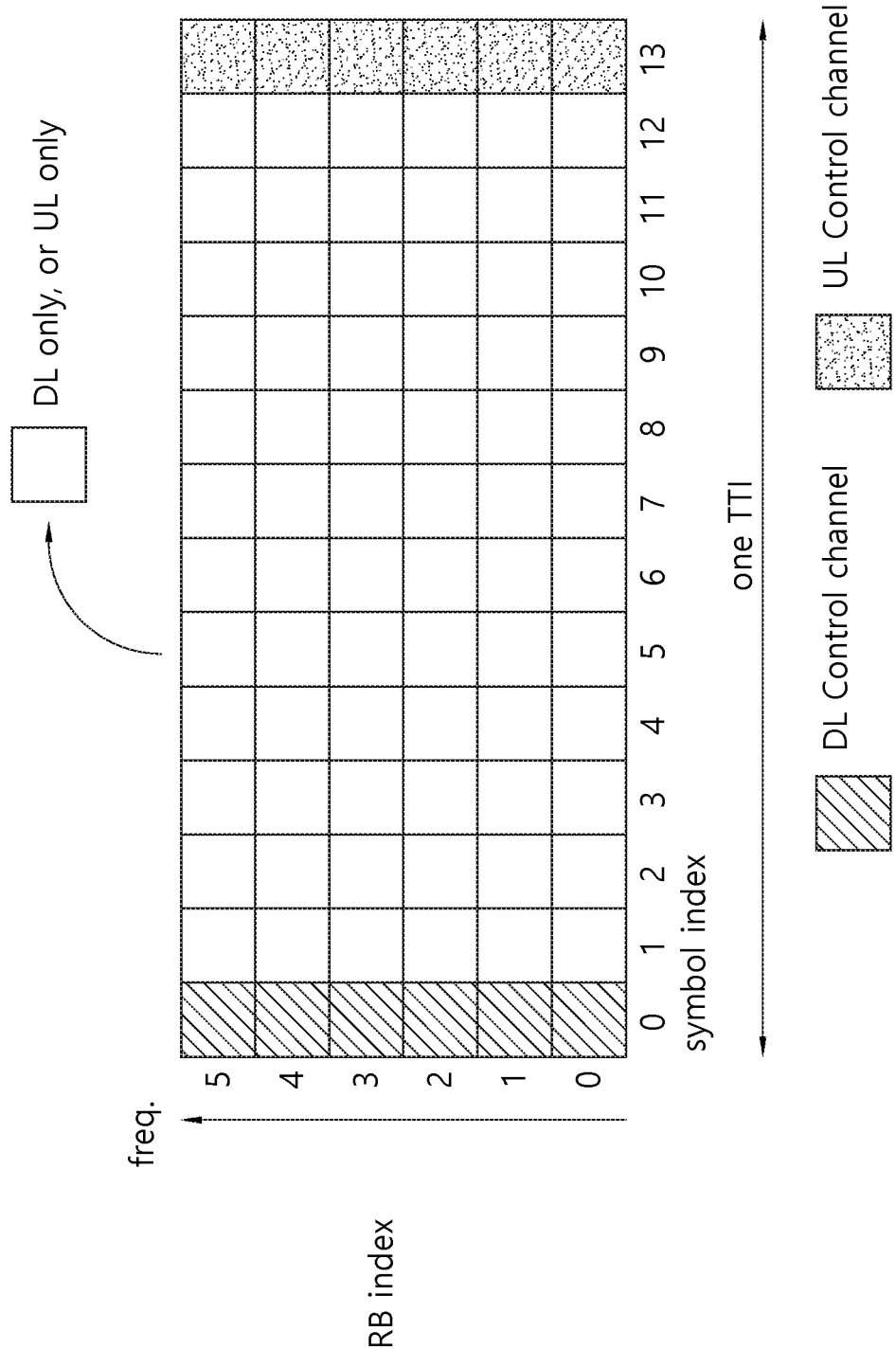
FIG. 6 shows an example of the frame structure for the new radio access technology.

FIG. 6 shows an example of the frame structure for the new radio access technology.

In the NR, a structure in which a control channel and a data channel are time division multiplexing (TDM) in one TTI, as shown in FIG. 6, may be considered as one of frame structures to minimize latency.

In FIG. 6, the shadow area represents downlink control region and the dark area represents uplink control region. The remaining area may also be used for downlink (DL) data transmission or uplink (UL) data transmission. The structure is characterized in that, the DL transmission and UL transmission are sequentially performed in a subframe, therefore may send DL data and receive UL ACK/NACK even in a subframe. Consequently, the time consumed until data retransmission is reduced when data transmission error occurs, thereby minimizing the latency of the final data transmission.

In such a self-contained subframe structure, a time gap may be required for the switching process from a transmission mode to a reception mode or the switching process from a reception mode to a transmission mode between an eNB and a UE. For this reason, a part of OFDM symbol on the time of switching from DL to UL may be set as a gourd period (GP) in the self-contained the subframe structure.

<Analog Beamforming #1>

Millimeter waves (mmW) have a short wavelength, in which a plurality of antennas can be installed in the same area. That is, a 30-GHz band has a wavelength of 1 cm, in which a total of 100 antenna elements can be installed in a two-dimensional array at an interval of 0.5λ (wavelength) intervals on a panel of 5 by 5 cm. Therefore, in mmW, a plurality of antenna elements is used to increase a beamforming (BF) gain, thereby increasing coverage or increasing throughput.

In this case, when each antenna element has a transceiver unit (TXRU) in order to adjust transmission power and a phase, independent beamforming can be performed for each frequency resource. However, it is cost-ineffective to install a TXRU in each of the 100 antenna elements. Therefore, it is considered to map a plurality of antenna elements to one TXRU and to adjust the direction of a beam using an analog phase shifter. However, this analog beamforming method can create a beam in only one direction in the entire band and thus cannot achieve frequency-selective beamforming.

Hybrid BF having B TXRUs, where B is smaller than Q as the number of antenna elements, is considered as an intermediate form of digital BF and analog BF. In this case, although changing depending on the method for mapping the B TXRUs and the Q antenna elements, the number of directions of beams that can be simultaneously transmitted is limited to B or less.

<Analog Beamforming #2>

In a new RAT system, when a plurality of antennas is used, hybrid beamforming as a combination of digital beamforming and analog beamforming is notable. Here, analog beamforming (or RF beamforming) refers to a precoding (or combining) operation performed by an RF terminal. In hybrid beamforming, each of a baseband terminal and an RF terminal performs precoding (or combining), thus achieving performance comparable to that in digital beamforming while reducing the number of RF chains and the D/A (A/D) converters. For convenience, a hybrid beamforming structure may be represented by N transceiver units (TXRUs) and M physical antennas. Accordingly, digital beamforming for L data layers to be transmitted by a transmission terminal may be represented by an N-by-L matrix. Subsequently, N converted digital signals are converted into analog signals via the TXRUs and are then subjected to analog beamforming represented by an M-by-N matrix.

Figure 7:
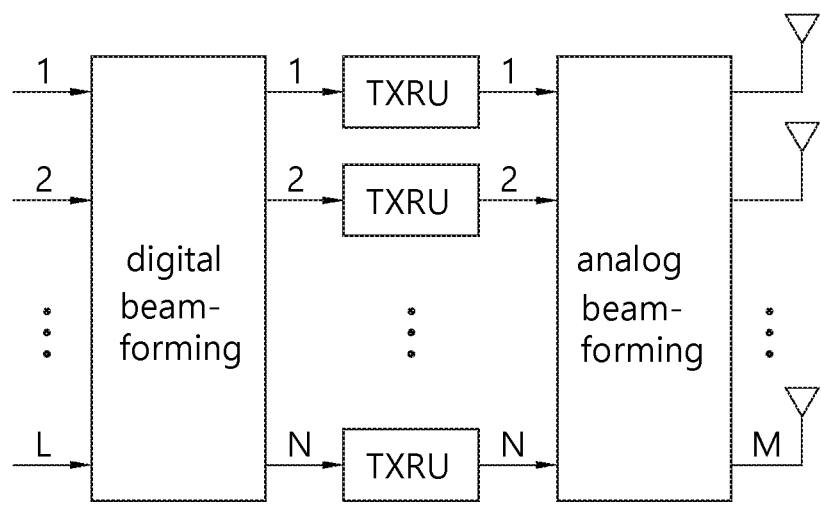
FIG. 7 is a view abstractly schematizing a hybrid beamforming structure in view of the TXRU and physical antennas.

FIG. 7 is a view abstractly schematizing a hybrid beamforming structure in view of the TXRU and physical antennas.

In FIG. 7, the number of digital beams is L and the number of analog beams is N. Further, in the new RAT system, it is considered that a BS is designed to change analog beamforming in units of symbols to support more efficient beamforming for a UE located in a specific area. In addition, in the new RAT system, even a scheme of introducing multiple antenna panels to which independently hybrid beamforming is applicable, when N TXRUs and M RF antennas are defined as one antenna panel in FIG. 7, is also considered.

When the BS utilizes a plurality of analog beams as described above, an analog beam advantageous for signal reception may be different for each UE, and thus, a beam sweeping operation in which the BS changes a plurality of analog beams to be supplied for each symbols in a specific subframe so that all the UEs may have a reception opportunity is considered.

Figure 8:
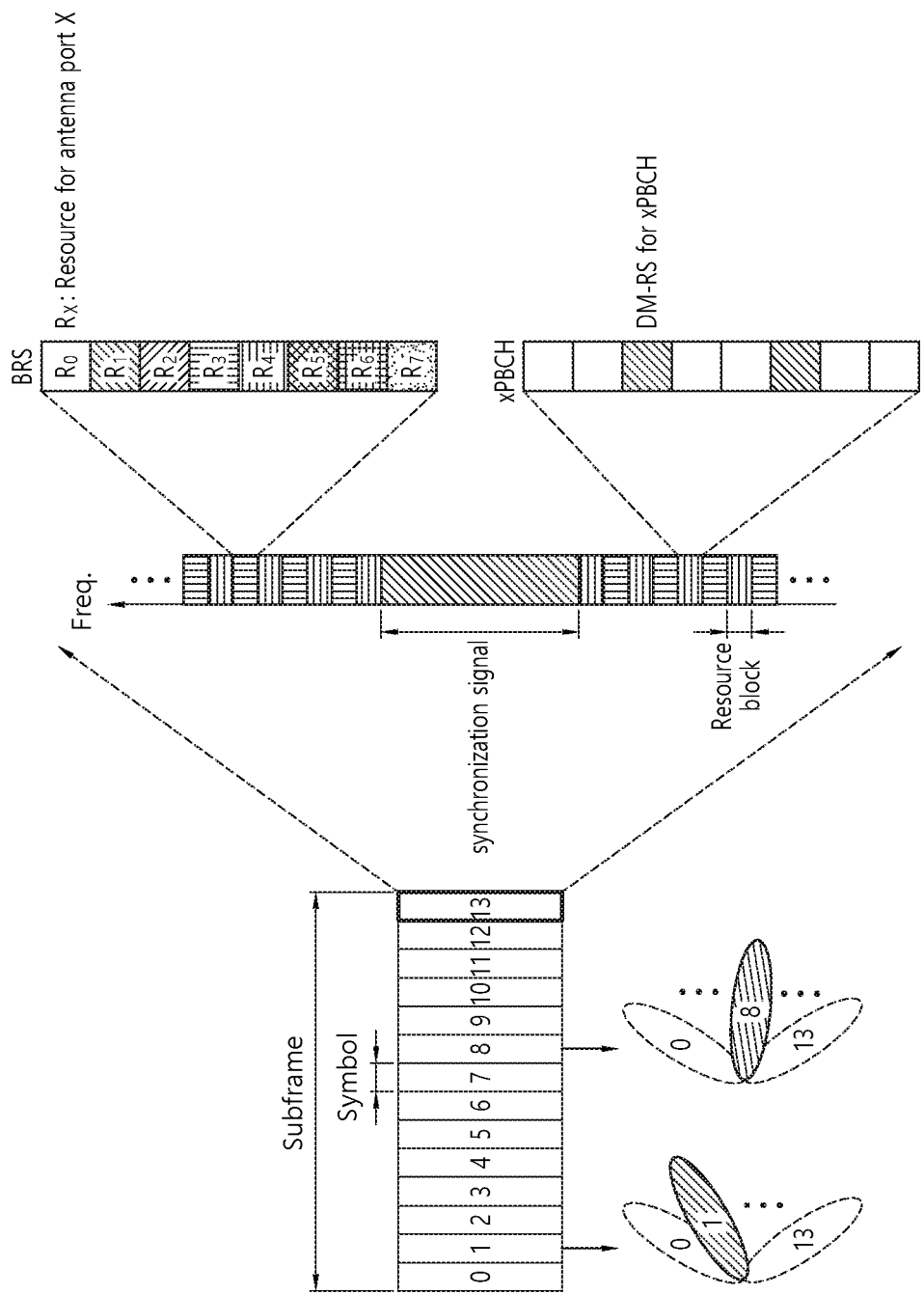
FIG. 8 is a view schematizing the beam sweeping operation for a synchronization signal and system information during a downlink (DL) transmission process.

FIG. 8 is a view schematizing the beam sweeping operation for a synchronization signal and system information during a downlink (DL) transmission process.

In FIG. 8, a physical resource (or a physical channel) in which system information of a new RAT system is transmitted in a broadcasting manner is referred to as an xPBCH (physical broadcast channel). Here, analog beams belonging to different antenna panels may be simultaneously transmitted within one symbol. In order to measure a channel for each analog beam, as illustrated in FIG. 8, a scheme of introducing a beam RS (BRS), which is a reference signal (RS) to which a single analog beam (corresponding to a specific antenna) is applied and transmitted, is under discussion. The BRS may be defined for a plurality of antenna ports, and each antenna port of the BRS may correspond to a single analog beam. Here, unlike the BRS, all the analog beams of an analog beam group may be applied to the synchronization signal or the xPBCH and transmitted so that a certain UE may receive the synchronization signal or xPBCH.

Hereinafter, the disclosure will be described in more detail.

The disclosure proposes a method for allocating a resource when a base station schedules DL/UL data transmission for a UE.

In a wireless communication system, such as an LTE system, DL/UL data transmission may be scheduled for a UE through downlink control information (DCI) transmitted via a physical downlink control channel (PDCCH), which is a physical channel for transmitting control information. In data transmission scheduling, a transport block size (TBS) is determined on the basis of an MCS index in the DCI and a value corresponding to the number of RBs allocated for the UE from a TBS table. Here, TBS values are based on the assumption that any UE can be always allocated 14 symbols in the time domain and up to 110 RBs in the frequency domain in scheduling for DL/UL data transmission. Methods for DL resource allocation (RA) in the frequency domain include a bitmap method and a compact method. The bitmap method enables noncontiguous RB allocation in the entire system bandwidth without restriction, and may increase the number of bits required for RA when the number of allocated RBs increases. The compact method enables contiguous RB allocation using a starting RB number called as a resource indication value (MV) and a number of contiguous RBs. RA types include Type 0, Type 1, and Type 2, wherein Type 0 and Type 1 are bitmap methods, and Type 2 is a compact. In Type 0 and Type 1, RA is performed per resource block group (RBG) as a set of RBs having a size determined according to the system bandwidth. UL RA methods include Type 0 and Type 1. Type 0 is a contiguous resource allocation method based on a MV, and Type 1 is a resource allocation method based on a plurality of clusters including contiguous RBs.

Recently, the 3GPP has conducted the standardization of a wireless communication system using NR as a 5G wireless communication system. The NR system is intended to support a plurality of logical networks in a single physical system and is thus designed to support services having various requirements (e.g., eMBB, mMTC, and URLLC services). For example, a PDSCH and a PUSCH as physical channels for DL/UL data transmission may also be defined in NR. For a PDSCH or PUSCH in NR, a relatively large number of OFDM symbols are configured to transmit a great amount of data, or a relatively small number of OFDM symbols are configured to support low-latency transmission. In this manner, various numbers of symbols may be allocated for data transmission. The duration of data transmission may be semi-statically configured and/or dynamically indicated by a base station, and a transmission start symbol and a transmission termination symbol are also variable. As a method for allocating a resource in the frequency domain, all of RA Type 0, 1, and 2 are taken into consideration on the basis of an LTE resource allocation method.

Also, in NR, since transmission bandwidth is up to 400 MHz and UEs having various supportable bandwidths can coexist, there are a carrier bandwidth, a UE-supported bandwidth, and a bandwidth part for actual resource allocation. DL/UL data scheduling may be performed within the entire carrier bandwidth, or may be performed via two stages in the frequency domain by indicating a bandwidth part within a UE-supported bandwidth in the entire carrier bandwidth and allocating RBs for data transmission within the bandwidth part.

Hereinafter, the present description proposes a resource allocation method for data scheduling in an NR system supporting a PDSCH and a PUSCH which include various numbers of symbols as described above. Although operations in the NR system are illustrated below for convenience, proposed methods according to the present description may also be applied to general wireless communication systems.

As described above, conventionally, the number of symbols included in one slot is fixed, and the number of data symbols of a PDSCH or a PUSCH scheduled in one slot is fixed. In NR, however, the number of symbols included in one slot may vary by slot, and the number of data symbols scheduled in one slot may also vary by slot.

Specifically, regarding a slot structure applicable in NR, slots may be numbered in ascending order such as $n_s^\mu \in \{0, \ldots, N_{slot}^{subframe,\mu}-1\}$ within one subframe and may be numbered in ascending order such as $n_{s,f}^\mu \in \{0, \ldots, N_{slot}^{frame,\mu}-1\}$ within one frame according to the subcarrier spacing configuration μ. One slot includes $N_{symb}^{slot}$ successive OFDM symbols, and $N_{symb}^{slot}$ depends on a cyclic prefix according to Table 1 and Table 2.

Here, $n_s^\mu$ denotes a slot number in one subframe according to the subcarrier spacing configuration μ. $N_{slot}^{subframe,\mu}$ denotes the number of slots per subframe according to the subcarrier spacing configuration μ. $N_{symb}^{slot}$ denotes the number of slots per frame according to the subcarrier spacing configuration μ. $N_{symb}^{slot}$ denotes the number of symbols per slot. Table 1 and Table 2 are illustrated below.

TABLE 1

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 2

| μ | $N_{symb}^{slot}$ | $N_{slot}^{frame, \mu}$ | $N_{slot}^{subframe, \mu}$ |
|---|---|---|---|
| 2 | 12 | 40 | 4 |

The start of a slot $n_s^\mu$ in one subframe is aligned in time with the start of an OFDM symbol $n_s^\mu N_{symb}^{slot}$ in the same subframe. OFDM symbols in one slot may be classified as downlink (D in Table 3), flexible (X in Table 3), and uplink (U in Table 3). Table 3 is used when a slot format indicator (SFI)-RNTI is used to indicate a slot format. Table 3 is illustrated below.

TABLE 3

| | Symbol number in slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |

TABLE 3-continued

| Format | Symbol number in slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | D | X | U | D | D | D | D | D | X | U |
| 47 | D | D | X | U | U | U | U | D | D | X | U | U | U | U |
| 48 | D | X | U | U | U | U | U | D | X | U | U | U | U | U |
| 49 | D | D | D | D | X | X | U | D | D | D | D | X | X | U |
| 50 | D | D | X | X | U | U | U | D | D | X | X | U | U | U |
| 51 | D | X | X | U | U | U | U | D | X | X | U | U | U | U |
| 52 | D | X | X | X | X | U | U | D | X | X | X | X | X | U |
| 53 | D | X | X | X | X | X | U | D | X | X | X | X | X | U |
| 54 | X | X | X | X | X | X | X | D | D | D | D | D | D | D |
| 55 | D | D | X | X | X | U | U | U | D | D | D | D | D | D |
| 56-255 | Reserved | | | | | | | | | | | | | |

Here, in slots within a downlink frame, a UE needs to assume that downlink transmission is performed only in downlink or flexible symbols. Further, in slots within an uplink frame, the UE is allowed to perform transmission only in uplink or flexible symbols.

Further, in NR, a transmission bandwidth of up to 400 MHz may be supported, and a low-cost UE may have a limited transmission bandwidth. Accordingly, the maximum bandwidth allocable to a UE may vary by UE. Therefore, a resource allocation method capable of transmitting or receiving a transmission block having the maximum size in view of various numbers of symbols schedulable in a slot may be needed.

Accordingly, the disclosure proposes a resource allocation method of a base station in view of the number of data symbols variably scheduled.

Figure 9:
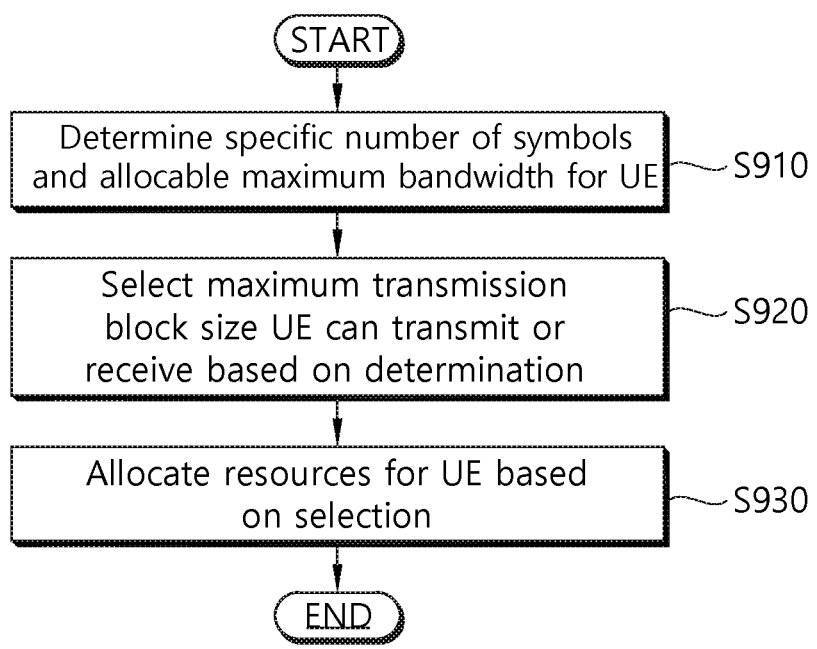
FIG. 9 is a flowchart illustrating a method for a base station to allocate a resource for a UE according to an embodiment of the disclosure.

FIG. 9 is a flowchart illustrating a method for a base station to allocate a resource for a UE according to an embodiment of the disclosure.

Referring to FIG. 9, the base station may determine a specified number of symbols and a maximum bandwidth allocable for the UE (S910).

The base station may select a maximum transmission block size for transmission or reception of the UE on the basis of the determination (S920).

The base station may perform resource allocation for the UE on the basis of the selection (S930).

The specified number of symbols may be less than the number of symbols included in one slot.

The number of data symbols allocated to the UE may be greater than the specified number of symbols.

When the resource allocation is performed, the resource allocation may be performed on the basis of UE capability information received from the UE.

The UE capability information may indicate the capability of the UE with respect to at least one of the specified number of symbols, the maximum bandwidth, and the maximum transmission block size.

The base station may receive the UE capability information during an initial access process or an RRC connection process.

When a greater number of symbols than the specified number of symbols are allocated, the position of a bandwidth to be allocated to the UE within the maximum bandwidth may be set in advance.

When the resource allocation is performed, the number of data symbols to be allocated to the UE may be set in advance.

The number of data symbols may be set in advance on the basis of the number of resource blocks allocated to the UE.

The resource allocation may be performed on the basis of a two-dimensional bitmap in a time-frequency domain.

The base station may transmit downlink control information (DCI) to the UE, and the DCI may indicate the number of resources used for actual data transmission.

In the resource allocation, data transmission duration and a frequency-domain resource may be determined in view of only the maximum bandwidth.

The maximum transmission block size may be determined on the basis of the number of subcarrier groups that are sets of a plurality of subcarriers.

The maximum transmission block size may be determined on the basis of a transmission block size table, and the transmission block size table may be defined by a combination of a modulation and coding scheme (MCS) and the number of subcarrier groups.

Hereinafter, a resource allocation method using resources in a two-dimensional time-frequency domain is proposed.

[Proposed method #1] Method in which maximum allocable bandwidth capable of supporting maximum TBS is set on basis of specified number of data symbols and RBG granularity is differently interpreted according to data symbol duration In NR, the case where not only a data transmission start symbol and a data transmission end symbol in each slot but also the duration of data transmission is variable is taken into consideration. Here, a base station may semi-statically configure and/or dynamically indicate the duration of data transmission in each slot to a UE.

Considering UE cost from the perspective of decoding processing and/or buffer memory, a low-cost UE may have the maximum TBS for transmission/reception that is relatively smaller than that for other UEs. If the maximum allocable bandwidth is configured to enable transmission/reception with the maximum TBS when the low-cost UE is allocated all symbols included in one slot, when a data transmission period is changed, transmission/reception with the maximum TBS may be impossible.

For example, if a slot includes 14 symbols, all the symbols may be allocated for DL transmission in one slot but seven symbols may be allocated for DL transmission in another slot. Here, assuming that the UE is allocated 14 symbols and transmits a TB with the maximum TBS through the maximum allocable bandwidth, when seven symbols are allocated, the UE can transmit a TB with only half the maximum TBS through the same bandwidth. Therefore, to solve such inefficient use of resources, it is proposed to configure the maximum allocable bandwidth capable of supporting the maximum TBS on the basis of the specified number of symbols (less than the number of symbols included in one slot). Here, the specified number of symbols may be less than the number of symbols included in one slot The maximum allocable bandwidth for a UE is defined as $BW_{MAX}$, the maximum supported TBS as $TBS_{MAX}$, and the specified number of data symbols as Ds (Ds may be smaller than the maximum number of symbols included in a slot). Here, the maximum allocable bandwidth $BW_{MAX}$ is configured so that the UE can support the maximum TBS $TBS_{MAX}$ with up to the specified number of data symbols Ds. When the base station allocates a greater number of symbols than the specified number of symbols to the UE, the UE can support the maximum TBS only with a bandwidth smaller than $BW_{MAX}$. Further, in this case, the UE may report its information about $BW_{MAX}$, $TBS_{MAX}$, and Ds to the base station at the proper time (e.g., in an initial access process or RRC connection process).

That is, the base station can perform resource allocation for the UE such that the UE can determine the maximum transmission block size for transmission or reception on the basis of the specified number of symbols and the maximum allocable bandwidth for the UE, and can transmit or receive a transmission block corresponding to the maximum transmission block size only with a bandwidth less than the maximum allocable bandwidth when the number of data symbols actually allocated to the UE is greater than the specified number of symbols.

For example, if Ds is 7 and the UE is allocated 14 symbols for data transmission, the UE can transmit a TB with the maximum supported TBS $TBS_{MAX}$ through only half the maximum allocable bandwidth $BW_{MAX}$. Therefore, the maximum allocable bandwidth as frequency resources for the UE is determined according to the number of allocated data symbols as time resources, in which the RBG size is variably determined depending on the maximum allocable bandwidth with the same number of bits for frequency resource allocation. Specifically, as the number of data symbols as time resources increases, the maximum allocable bandwidth as frequency resources for the UE may be set to decrease. Here, with the same number of bits for frequency resource allocation, as the number of data symbols increases, the number of REs (or RBs) included in an RBG may be set to decrease, or RB granularity for interpreting RA may decrease.

For example, case (i) where the number of allocated symbols is 14 is compared with case (ii) where the number of allocated symbols is 7. In case (i), since there are a relatively large number of data symbols, the maximum allocable bandwidth is smaller than in case (ii). Although (i) and (ii) have the same total number of RBGs when dividing the maximum allocable bandwidth by an RBG, the number of RBs included in the RBG in (i) is smaller than that in (ii), making it possible to allocate resources in finer units in (i).

That is, resource allocation is performed in resource block groups, and case (i) has a smaller allocable bandwidth than case (ii), in which case resource allocation may be possible in smaller resource block groups in case (i).

When a greater number of symbols than the specified number of symbols are allocated, the maximum allocable bandwidth is reduced, and the position of the reduced maximum allocable bandwidth in $BW_{MAX}$ needs to be set in advance. According to illustrative setting methods, the position may be fixed in advance for each UE or may be set for a particular UE from a frequency lowest index or from a highest frequency index. Further, various methods for setting a maximum allocable bandwidth may be set by the base station.

For example, assuming that the maximum allocable bandwidth is 100 RBs when seven symbols are allocated for data transmission, when 14 symbols are allocated, the maximum allocable bandwidth is reduced to 50 RBs. Here, these 50 RBs may be determined by the base station designating 50 of the 100 RBs in the case of seven symbols in ascending order from the lowest RB index or in descending order from the highest RB index or designating 50 RBs in the middle excluding 25 RBs on the top and 25 RBs on the bottom.

[Proposed method #2] Method in which base station semi-statically configures and/or dynamically indicates data transmission duration (i.e., number of data symbols) to UE according to frequency resources (i.e., number of RBs) allocated for data transmission In NR, since a base station can semi-statically configure and/or dynamically indicate data transmission duration (i.e., the number of data symbols) for a UE, it is possible to allocate resources by adjusting not only RBs as frequency resources but also the number of data symbols as time resources in resource allocation for data transmission. If data transmission duration is configured in advance according to the allocation of RBs as frequency resources in data transmission scheduling, it is possible to perform RA only through RB allocation without any dynamic indication about data transmission duration. For example, it is possible to transmit a TB with the maximum TBS: by configuring short data transmission duration if a great number of RBs are allocated; and by configuring long data transmission duration if a small number of RBs are allocated.

That is, the number of data symbols to be used by the UE may be set in advance on the basis of the number of resource blocks allocated for the UE. Accordingly, it is possible to perform resource allocation in the time domain only through resource allocation in the frequency domain without any dynamic indication.

Specifically, defining the number of allocated RBs as $N_{RB}$ and data transmission time as Ds, data transmission duration may be determined according to rules agreed in advance between the base station and the UE. For example, if rules about the number of RBs as frequency resources and transmission duration are predefined as illustrated below, data transmission duration is also determined according to the number of RBs actually allocated by the base station in data scheduling.

For example, by setting a resource block range to $D_{S2}$ when $N_1 \leq N_{RB} < N_2$, to $D_{S1}$ when $N_2 \leq N_{RB} < N_3$, and the like, a different data transmission time may be set according to the set range.

Here, $N_i$ denotes the number of RBs and satisfies $N_i < N_{i+1}$ and $D_{Si}$ denotes data transmission duration when the number of allocated RBs is within the range. For a low-cost UE as in method #1, the duration of data symbols may be set to be long as the number of RBs decreases, and $D_{S1} > D_{S2}$ is satisfied.

The proposed method determines data transmission duration according to the predetermined rules, thus also reducing the DCI payload size.

In the method of dynamically determining data transmission duration according to the number of RBs, it is possible to define data transmission duration sets, to determine a data transmission duration set to select by comparing the number of allocated RBs with a specific RB threshold, and to indicate the number of symbols allocated for actual data transmission through DCI. For example, two sets having seven states of data transmission duration, which are set A where data transmission duration is one symbol to seven symbols and set B where data transmission duration is eight to fourteen symbols, can be defined, and the accurate number of data symbols can be indicated through three bits in each set. If an RB threshold for dividing data transmission duration sets is 50 RBs, less than 50 RBs actually allocated can be recognized as set B, and three bits indicating the number of data symbols in data scheduling DCI can be interpreted as one of the eight to fourteen data symbols.

[Proposed method #3] Method in which base station configures two-dimensional time-frequency minimum unit for resource allocation for UE in advance through higher-layer signal and allocates resources in minimum units in actual transmission scheduling This proposed method is an extension to the time domain of allocation of noncontiguous RBs within the entire available bandwidth by a bitmap method, such as DL RA Type 0 or 1, in the frequency domain through an RA field in DCI in the case where a base station schedules data transmission for a UE through the DCI. That is, two-dimensional time-frequency resources are allocated by including not only a frequency-domain bitmap but also a time-domain bitmap in the RA field in the DCI, in which the minimum unit for resource allocation may be configured in advance through a higher-layer signal. Therefore, resources can be allocated by a unit of a single RB or an RBG as a bundle of RBs in the frequency domain, while a single data symbol or a bundle of data symbols may be allocated as the minimum unit for actual data transmission by the bitmap in the time domain.

Figure 10:
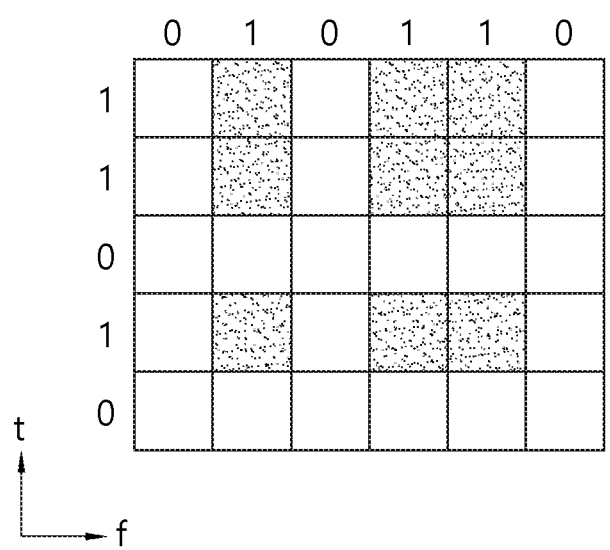
FIG. 10 illustrates an example of a method of allocating a resource in a two-dimension time-frequency domain according to an embodiment of the disclosure.

FIG. 10 illustrates an example of a method of allocating a resource in a two-dimension time-frequency domain according to an embodiment of the disclosure.

Referring to FIG. 10, when there are two-dimensional resources in the time-frequency domain, only two-dimensional resources corresponding to the intersection of data symbols indicated for allocation in a time-domain bitmap and resource blocks indicated for allocation in a frequency-domain bitmap may be allocated for actual data transmission. Here, two-dimensional bitmap information may include 11 bits and may be configured as "11010 010110" in time-frequency order or as "010110 11010" in frequency-time order.

That is, for example, when the two-dimensional bitmap information includes 11 bits and is configured as "11010 010110" in time-frequency order, only two-dimensional resources corresponding to a first data symbol, a second data symbol, and a fourth data symbol on the time axis and a second resource block, a fourth resource block, and a fifth resource block on the frequency axis may be set as resources allocated for actual data transmission. Here, the two-dimensional bitmap information may also be configured as "010110 11010" in frequency-time order. FIG. 10 shows the above-described example.

The proposed resource allocation method may have a disadvantage that a frequency-domain resource block (minimum resource allocation unit) once allocated in the time domain is inevitably allocated even at a position where the same frequency-domain resource block is set to 1 in a different time resource. According to a method for solving this disadvantage, the total number of allocated resource blocks may be indicated via DCI.

FIG. 11 illustrates another example of a method of allocating a resource in a two-dimension time-frequency domain according to an embodiment of the disclosure.

For example, when the number of allocated resource blocks is 7 in the bitmap information illustrated in FIG. 10, non-repetitive resource allocation may be supported as follows. Here, the position of a resource block actually allocated among two-dimensional resources generated in a bitmap may be counted first in time or frequency.

Similarly, there may be a method of supporting non-repetitive resource allocations using offset information about actual resource block (RB) allocation instead of indicating the total number of allocated resource blocks (RBs). In the case of non-repetitive resource allocation, transmission power in the time or frequency domain may be adjusted differently in view of actually allocated two-dimensional resources. Further, when the interval between noncontiguous resource allocations is greater than a certain value, different types of precoding may be used for the noncontiguous resource allocations. When the proposed resource allocation method is applied for an uplink, symbols allocated as contiguous or noncontiguous frequency resources at a particular time may be interpreted by an indirect signaling method so that the symbols may be modulated by DFT-s-OFDM or OFDM respectively. Particularly, when DFT-s-OFDM modulation is indicated through DCI or a higher message, if noncontiguous resource allocation is set in frequency, a corresponding symbol may be changed by OFDM modulation and may be transmitted.

That is, in the example illustrated above in FIG. 10, for example, when the number of allocated two-dimensional resources is seven, it may be necessary to select only seven of the nine resources selected in FIG. 10 as resources allocated for actual data transmission, two examples of which are illustrated in (a) and (b) in FIG. 11.

In FIG. 11. (a) illustrates an example of selecting resources allocated for actual data transmission on the basis of the frequency axis as a selection criterion. That is, seven resources corresponding to a second resource block position, a fourth resource block position, and a fifth resource block position are selected in order from among resources corresponding to bits of "010110" selected on the basis of the frequency axis from among a total of nine selected resources. Therefore, the last two resources on the time axis among resources corresponding to the last fifth resource block position are not selected.

In FIG. 11, (b) illustrates an example of selecting resources allocated for actual data transmission on the basis of the time axis as a selection criterion. That is, seven resources corresponding to a first symbol position, a second symbol position, and a fourth symbol position are selected in order from among resources corresponding to bits of "11010" selected on the basis of the time axis from among a total of nine selected resources. Therefore, the last two resources on the frequency axis among resources corresponding to the last fourth resource block position are not selected. As described above, using the method illustrated in (a) or (b) of FIG. 11 makes it possible to variously and resource-efficiently allocate resources.

[Proposed method #4] Method of allocating resources by joint encoding of data transmission duration and frequency-domain resource allocation only in view of valid maximum allocable bandwidth In DL/UL data scheduling, since data transmission duration is variable, an RB region unnecessary to support the maximum TBX may be exist for particular data transmission duration. For example, for data transmission duration of seven symbols or less, it is possible to support the maximum TBS by utilizing the maximum bandwidth allocable for a UE or the entire allocated system bandwidth; for data transmission duration longer than seven symbols, it is possible to support the maximum TBS only using a bandwidth shorter than the maximum bandwidth allocable for the UE.

Specifically, in the resource allocation method, when data transmission duration is semi-statically configured or dynamically indicated, a region which does not need considering in a TBS table, and thus a combination of data transmission duration (i.e., the number of data symbols) and the number of RBs which are unnecessary is excluded from joint encoding of data transmission duration and frequency resource allocation (i.e., RB allocation) into one DCI field, thereby reducing the number of bits required for resource allocation for the DCI.

That is, when the maximum allocable bandwidth is determined for the UE and the maximum transmission block size is determined accordingly, information about a transmission block size greater than the determined maximum transmission block size may no longer be needed for the UE. Accordingly, when the number of data transmission symbols and frequency-domain resource allocation are subjected to joint encoding in DCI, the joint encoding may be performed by excluding the information about the transmission block size greater than the determined maximum transmission block size. Accordingly, it is possible to reduce the number of bits required for resource allocation for the DCI.

Hereinafter, a transmission block size (TBS) determination method using resources in a two-dimensional time-frequency domain is proposed.

[Proposed method #5] Method in which TBS table is configured according to combination of number of data symbols and number of RBs for data transmission and TBS is determined corresponding to number of symbols actually allocated and number of RBs actually allocated when base station schedules data transmission for UE In NR, since variable DL/UL data transmission duration (i.e., the number of data symbols) may be scheduled to support a dynamic TDD operation, a transmission block size determination method considering not only an MCS index and the number of allocated resource blocks but also data transmission duration may be taken into consideration.

Accordingly, a TBS determination method according to the specified number of subcarriers or the specified number K of subcarrier groups is proposed. For example, defining a TBS table according to combinations of multiples of the number K of subcarrier groups (i.e., K, 2K, 3K, . . . ) and an MCS, the total quantity of subcarriers on time/frequency resources allocated for data transmission may be converted into a multiple of the number of subcarrier groups, thereby determining a TBS.

For example, two symbols on the time axis and 2K subcarrier groups on the frequency axis are allocated, a TBS may correspond to (2.2K)=4K. In another example, four symbols on the time axis and K subcarrier groups on the frequency axis are allocated, a TBS may correspond to (2.2K)=4K likewise.

That is, in NR, a transmission block size may be determined in view of the number of symbols allocated for data transmission and the number of frequency resources allocated for data transmission. Here, the number of frequency resources may be determined on the basis of the specified number of subcarrier groups. For example, when the number of symbols allocated for data transmission is two and the number of frequency resources allocated for data transmission is 2K, a transmission block size may correspond to 4K. That is, the transmission block size may be converted into the quantity of resources allocated for actual data transmission.

In addition, a TBS determination method considering a combination of the number of data symbols allocated for data transmission and the number of subcarriers or subcarrier groups allocated for data transmission is proposed. For example, when 12 subcarriers are defined as one subcarrier group and there are a specified number X of subcarrier groups and a specified number Y of data symbols, a TBS table may be configured according to combinations of multiples of (X·Y) and an MCS. The number N of data symbols allocated for actual data transmission and the number K of subcarrier groups allocated for actual data transmission may be dynamically indicated through DCI, in which a TBS corresponding to a multiple of (X·Y) corresponding to (N·K) may be determined. In this case, since different (N·K) combinations may correspond to the same multiple of (X·Y), the same TBS may be determined.

For example, a TBS determined on the basis of two data symbols and three subcarrier groups and a TBS determined on the basis of three data symbols and two subcarrier groups are equal in terms of the total number of REs and thus have the same value. Further, since X·Y does not have all successive values, a TBS value can be defined only with respect to a multiple of (X·Y) which can be expressed as a combination of the number of data symbols and the number of RBs.

Alternatively, in configuring a TBS table corresponding to the number X of subcarrier groups and an MCS value, it is possible to configure a separate TBS table according to the number Y of data symbols to be transmitted/received and to determine a TBS corresponding to the number of allocated RBs by referring to a TBS table corresponding to the number of symbols actually allocated when the base station schedules data transmission for the UE.

Proposed methods #1, #2, #3, #4, and #5 can be applied regardless of DL/UL transmission and may be applied in combination with other proposed methods as long as being compatible therewith.

Figure 12:
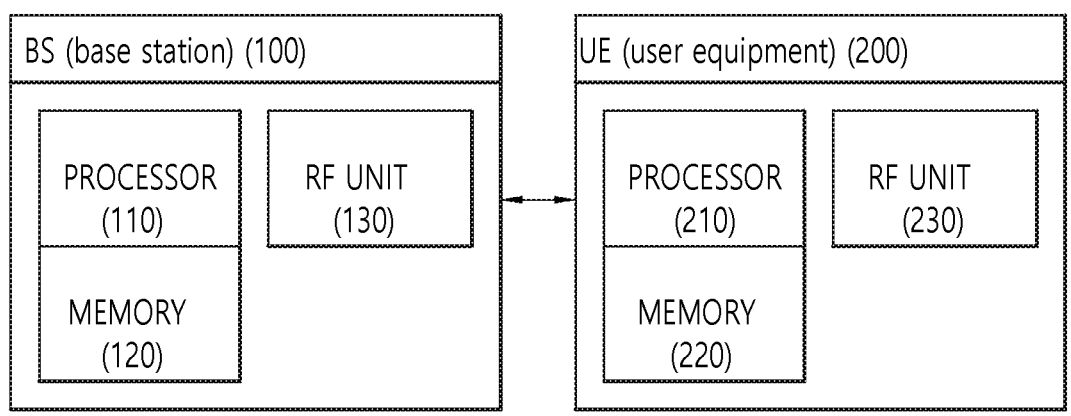
FIG. 12 is a block diagram illustrating a communication device according to an embodiment of the disclosure.

FIG. 12 is a block diagram illustrating a communication device according to an embodiment of the disclosure.

Referring to FIG. 12, a base station 100 includes a processor 110, a memory 120, and a transceiver 130. The processor 110 implements the proposed functions, processes, and/or methods. The memory 120 is connected to the processor 110 and stores various pieces of information to drive the processor 110. The transceiver 130 is connected to the processor 110 and transmits and/or receives a radio signal.

A UE 200 includes a processor 210, a memory 220, and an RF unit 230. The processor 110 implements the proposed functions, processes, and/or methods. The memory 220 is connected to the processor 210 and stores various pieces of information to drive the processor 210. The RF unit 230 is connected to the processor 210 and transmits and/or receives a radio signal.

The processor 110 and 210 may include an application-specific integrated circuit (ASIC), another chip set, a logical circuit, a data processing device, and/or a converter converting a baseband signal and a radio signal to and from one another. The memory 120 and 220 may include a read-only memory (ROM), a random access memory (RAM), a flash memory, a memory card, a storage medium, and/or another storage device. The transceiver 130 and 230 may include one or more antennas transmitting and/or receiving radio signals. When the embodiments are implemented as software, the above-described methods may be implemented as a module (process, function, and so on) performing the above-described functions. The module may be stored in the memory 120 and 220 and may be executed by the processor 110 and 210. The memory 120 and 220 may be located inside or outside of the processor 110 and 210 and may be connected to the processor 110 and 210 through a diversity of well-known means.

Figure 13:
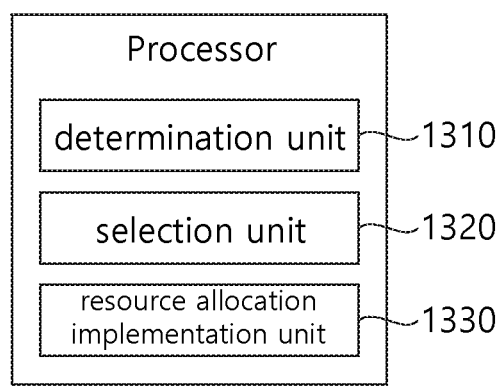
FIG. 13 is a block diagram illustrating an example of a device included in a processor.

FIG. 13 is a block diagram illustrating an example of a device included in a processor.

Referring to FIG. 13, the processor may include a determination unit 1310, a selection unit 1320, and a resource allocation implementation unit 1330 in terms of functionality. Here, the processor may be the processor 110 and 210 in FIG. 12.

The determination unit may have a function of determining a specified number of symbols and the maximum bandwidth allocable for a UE. The selection unit may have a function of selecting the maximum transmission block size for transmission or reception of the UE on the basis of the determination. The resource allocation implementation unit may have a function of performing resource allocation for the UE on the basis of the selection.

The device included in the processor described above is merely an example, and the processor may further include other function elements or devices. A specific example of an operation performed by each functional device described above is substantially the same as described above, and thus a redundant description is omitted herein.

What is claimed is:

1. A method for data transmission in a wireless communication system, the method performed by a user equipment (UE) and comprising:
   receiving frequency domain resource information from a base station, wherein the frequency domain resource information informs a number of frequency domain resource, and
   transmitting data based on the number of frequency domain resource and a number of time domain resource,
   wherein the number of time domain resource is determined based on the number of frequency domain resource, and
   wherein the number of time domain resource is determined based on a comparison result between the number of frequency domain resource and a threshold value.

2. The method of claim 1, wherein the frequency domain resource is a resource block (RB).

3. The method of claim 1, wherein the time domain resource is a symbol.

4. The method of claim 1, wherein the UE receives time domain resource information from the base station,
   wherein the number of time domain resource is determined based on the time domain resource information.

5. The method of claim 4, wherein the time domain resource information is included in downlink control information (DCI).

6. The method of claim 1, wherein the number of time domain resource is determined from among time domain resource candidates.

7. The method of claim 6, wherein the time domain resource candidates are pre-configured.

8. The method of claim 7, wherein each of the time domain resource candidates is pre-configured based on range of the number of frequency domain resource.

9. The method of claim 1, wherein the frequency domain resource information is transmitted semi-statically.

10. The method of claim 1, wherein the number of time domain resource is determined to be one of 1 to 7 based on the number of time domain resource being larger than the threshold value, and the number of time domain resource is determined to be one of 8 to 14 based on the number of time domain resource being smaller than the threshold value.

11. The method of claim 1, wherein the threshold value is pre-configured.

12. A user equipment (UE) comprising:
- a transceiver configured to transmit and receive a radio signal; and
- a processor operatively coupled with the transceiver, wherein the processor is configured to:
- receive frequency domain resource information from a base station, wherein the frequency domain resource information informs a number of frequency domain resource, and
- transmit data based on the number of frequency domain resource and a number of time domain resource,
- wherein the number of time domain resource is determined based on the number of frequency domain resource, and
- wherein the number of time domain resource is determined based on a comparison result between the number of frequency domain resource and a threshold value.

13. The UE of claim 12, wherein the UE is configured to communicate with at least one of a mobile terminal, a network or autonomous vehicles other than the UE.

* * * * *